No. 803,185. PATENTED OCT. 31, 1905.
J. McKINLEY.
WATER HOSE CARRIER.
APPLICATION FILED MAR. 10, 1904. RENEWED NOV. 25, 1904.

WITNESSES:
J. J. Laass.
L. H. Fulmer.

INVENTOR:
Judson McKinley
By E. Laass
ATTORNEY.

UNITED STATES PATENT OFFICE.

JUDSON McKINLEY, OF SYRACUSE, NEW YORK, ASSIGNOR TO SYRACUSE CHILLED PLOW COMPANY, OF SYRACUSE, NEW YORK, A CORPORATION OF NEW YORK.

WATER-HOSE CARRIER.

No. 803,185.      Specification of Letters Patent.      Patented Oct. 31, 1905.

Application filed March 10, 1904. Renewed November 25, 1904. Serial No. 234,103.

*To all whom it may concern:*

Be it known that I, JUDSON McKINLEY, of Syracuse, in the county of Onondaga, in the State of New York, have invented new and useful Improvements in Water-Hose Carriers, of which the following, taken in connection with the accompanying drawings, is a full, clear, and exact description.

This invention has for its object the production of a truck for carrying a hose while outstretched or uncoiled which is particularly simple in construction and highly efficient in use; and to this end it consists in the novel combinations and constructions hereinafter set forth and claimed.

In describing my invention reference is had to the accompanying drawings, in which like characters designate corresponding parts in all the views.

Figure 1:
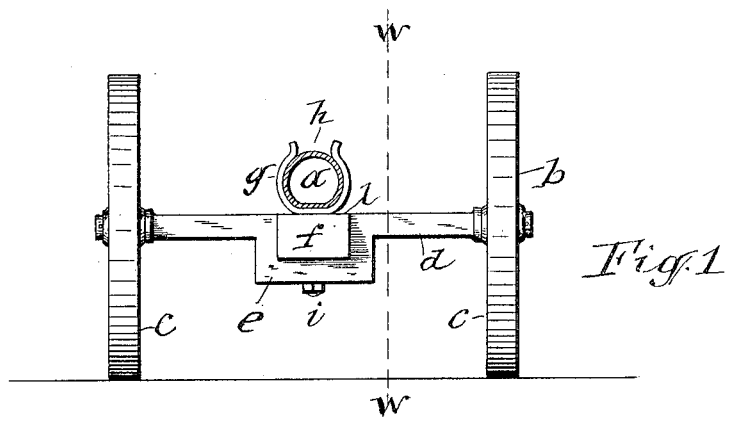
Figure 2:
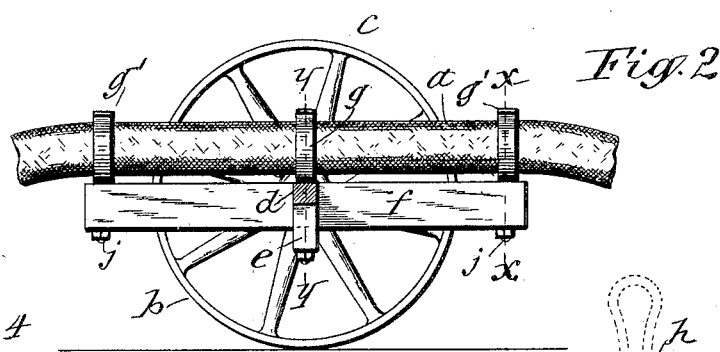
Figure 4:
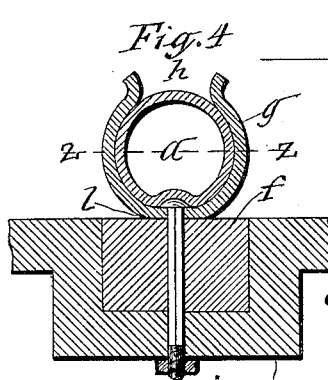
Figure 5:
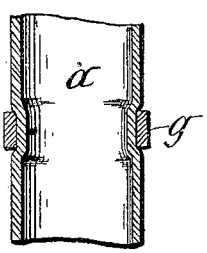
Figure 3:
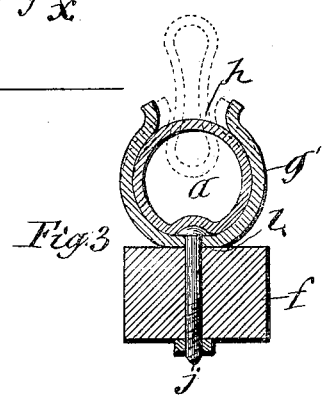

Figure 1 is an end view of my truck. Fig. 2 is a longitudinal sectional view on line W W, Fig. 1. Figs. 3 and 4 are enlarged vertical transverse sectional views taken, respectively, on lines X X and Y Y, Fig. 2. Fig. 5 is an enlarged longitudinal sectional view on line Z Z, Fig. 4.

$a$ is a hose, and $b$ one of a number of trucks used in carrying the hose outstretched or uncoiled, as when flushing streets. Said truck $b$ comprises a single pair of carrying-wheels $c$, a rigid axle $d$ having the wheels $c$ loosely mounted on the ends thereof and its central portion $e$ depressed below the axes of the wheels $c$, and a prolonged longitudinal hose-supporting member, as a bar $f$, seated in the depression $e$ and rigidly secured central of its length to the axle $d$. The member or bar $f$ extends a considerable distance to opposite sides of the axle $d$ at substantially right angles thereto and is provided with an upper surface which engages the hose $a$ and is disposed substantially coincident with the horizontal plane of the axes of the wheels $c$.

$g$ $g'$ are hose-clamps rising, respectively, from the central portion and the ends of the top surface of the bar $f$, each clamp being substantially circular in form and of slightly smaller diameter than the hose and having a contracted lateral hose-entrance $h$ at its top portion of less width than the diameter of the hose.

The clamp $g$ is fixed in position by a bolt $i$, which also secures the bar $f$ to the axle $d$, and the clamps $g'$, which are spaced apart from said clamp $g$, are pivotally connected to the ends of the bar $f$ by bolts $j$. It is thus apparent that the clamps $g'$ are free to move with the hose $a$ relatively to the clamp $g$ and the wheels $c$, especially when the truck is moving in a curved path. Said clamps $g$ $g'$ are preferably formed of steel or wrought-iron to render them slightly flexible and resilient and to cause them to grip the hose $a$ when expanded by the water, as seen in Fig. 5. The bases of the clamps $g$ $g'$ are usually flattened, as at $l$, for forming a longer bearing-surface therefor.

The construction and operation of my truck will now be readily understood upon reference to the foregoing description and the accompanying drawings, and it will be noted that more or less change may be made therein without departing from the spirit of my invention.

What I claim as my invention is—

1. A hose-truck consisting of an axle supported on carrying-wheels, a prolonged longitudinal hose-support rigidly secured to said axle and extending in opposite directions therefrom, and hose-clamps attached to the ends of said support.

2. A hose-truck consisting of an axle supported on carrying-wheels, a longitudinal bar fastened central of its length to said axle midway between the wheels thereof, and hose-clamps attached to said bar at different points in the length thereof.

3. The combination, with the hose-truck, of a hose-clamp fastened to the center of said truck, and hose-clamps pivotally connected to the ends of the truck, each of said clamps being of a slightly-smaller diameter than the hose and formed with a contracted lateral hose-entrance as set forth.

4. The combination of the truck having its axle formed with a depression central between the wheels, a longitudinal bar seated in said depression, and hose-clamps secured to the top of said bar at different points in the length thereof as set forth.

5. The combination of the truck having its axle formed with a depression central between the wheels, a longitudinal bar seated at the center of its length in said depression, a hose-clamp disposed erect upon the central portion of the aforesaid bar, a bolt rigidly tying together the said clamp, bar and axle, and hose-clamps pivotally secured to the end portions of the longitudinal bar as set forth and shown.

6. A device for supporting a hose intermediate of its ends comprising a pair of wheels, a supporting-surface for the hose, located between the wheels, extending at right angles to the axes of the wheels and disposed in substantially the horizontal plane of said axes and a clamping member secured to said surface.

7. In a truck for supporting a hose intermediate of its ends, the combination with a pair of wheels and an axle extending between the same, of a support extending a distance on opposite sides of the axle and disposed in substantially the horizontal plane of the axes of the wheels, and separated devices for clamping the hose to said support.

8. In a truck for supporting a hose intermediate of its ends, the combination with a pair of wheels and a rigid axle extending between the same, of supporting means for the hose located on opposite sides of the axle and in substantially the horizontal plane of the axes of the wheels.

9. In a truck for supporting a hose intermediate of its ends, the combination with a pair of wheels and a rigid axle extending between the same, of a supporting-surface for the hose disposed in substantially the horizontal plane of the axes of the wheels, and clamping devices spaced a distance apart rising from said surface, substantially as described.

10. In a truck for supporting a hose intermediate of its ends, the combination with a pair of wheels, of supporting means for the hose carried by the wheels in substantially the horizontal plane of the axes of the wheels, said supporting means being freely movable with the hose relatively to the wheels during the travel of the truck.

11. In a truck for supporting a hose intermediate of its ends, the combination with a pair of wheels, of devices for supporting the hose, spaced apart and arranged at opposite sides of the axes of the wheels, said devices being freely movable with the hose independently of each other and relatively to the wheels.

12. In a truck for supporting a hose intermediate of its ends, the combination with a single pair of wheels, and an axle extending between the same, of a supporting member secured to the axle centrally of the latter and extending at substantially right angles thereto, and means for clamping the hose to said member.

13. In a truck for supporting a hose intermediate of its ends, the combination with a single pair of wheels, and an axle extending between the same, of a supporting member secured to the axle centrally of the latter and extending at substantially right angles thereto, and movable means located at opposite ends of the support for clamping the hose thereto.

14. In a truck for supporting a hose intermediate of its ends, the combination with a single pair of wheels, and an axle extending between the same, of a supporting member secured to the axle centrally of the latter and extending at substantially right angles thereto, a device arranged centrally of the support for clamping the hose thereto, and additional devices spaced a distance from the central device for clamping the hose to the support.

15. In a truck for supporting a hose intermediate of its ends, the combination with a single pair of wheels, and an axle extending between the same, of a supporting member secured to the axle centrally of the latter and extending at substantially right angles thereto, a device arranged centrally of the support for clamping the hose thereto, and additional devices spaced a distance from the central device for clamping the hose to the support, said additional devices being movable independently of the support.

16. In a truck for supporting a hose intermediate of its ends, the combination with a single pair of wheels, and an axle extending between the same, of a supporting member secured to the axle centrally of the latter and extending at substantially right angles thereto, and resilient U-shaped devices for clamping the hose, the intermediate portions of said devices being flattened and being secured to said support.

JUDSON McKINLEY.

Witnesses:
J. J. LAASS,
G. VAN VORST.